United States Patent [19]

Balmforth

[11] Patent Number: 4,914,979
[45] Date of Patent: Apr. 10, 1990

[54] AXLE DRIVE UNIT
[75] Inventor: Harry Balmforth, Leeds, United Kingdom
[73] Assignee: GKN Axles Limited, Birmingham, England
[21] Appl. No.: 206,509
[22] Filed: Jun. 14, 1988
[30] Foreign Application Priority Data Aug. 7, 1987 [GB] United Kingdom ............... 8718782

[51] Int. Cl.⁴ ...................... F16H 37/06; B62D 61/10
[52] U.S. Cl. ................................ 475/221; 180/24.09; 475/253
[58] Field of Search ............... 74/674, 705, 720.5, 74/665 GA, 665.GC, 665 K; 180/24.09

[56] References Cited

U.S. PATENT DOCUMENTS

| 1,736,836 | 11/1929 | Rayburn | 180/24.09 |
|---|---|---|---|
| 2,267,562 | 12/1941 | Higgins | 180/24.09 X |
| 2,854,826 | 10/1958 | Foerster | 74/705 X |
| 2,870,853 | 1/1959 | Keese | 180/24.09 |
| 3,146,842 | 9/1964 | Nelson et al. | 180/24.09 |
| 3,945,452 | 3/1976 | Klaue | 180/24.09 |
| 3,976,154 | 8/1976 | Clark et al. | 180/24.09 X |
| 4,088,043 | 5/1978 | Johnson et al. | 74/705 X |
| 4,520,690 | 6/1985 | Dangel | 74/705 X |
| 4,599,916 | 7/1986 | Hirosawa | 74/720.5 X |
| 4,712,448 | 12/1987 | Lanzer | 74/665 GC |

FOREIGN PATENT DOCUMENTS

| 0635148 | 3/1934 | Fed. Rep. of Germany | 180/24.09 |
|---|---|---|---|
| 0014649 | 2/1981 | Japan | 74/674 |
| 0149598 | 9/1931 | Switzerland | 180/24.09 |
| 0310682 | 1/1956 | Switzerland | 74/674 |
| 0403585 | 10/1973 | U.S.S.R. | 180/24.09 |
| 1093798 | 12/1967 | United Kingdom . | |
| 1138942 | 1/1969 | United Kingdom . | |
| 1210964 | 11/1970 | United Kingdom . | |
| 1447875 | 9/1976 | United Kingdom . | |
| 2066182 | 7/1981 | United Kingdom . | |

Primary Examiner—Leslie A. Braun
Assistant Examiner—Harold F. Macris
Attorney, Agent, or Firm—Marshall, O'Toole, Gerstein, Murray & Bicknell

[57] ABSTRACT

An axle drive unit, for use in a tri-axle drive, comprises a casing (10) with an input member (18) at one end connected to the planet carrier (30) of a spur gear epicyclic differential gear whose sun gear (28) is connected to a tubular shaft (43) and then by gears (47, 56) to the input of an inter-wheel differential gear. The annulus gear (27) of the epicyclic differential gear is connected to a driving shaft (40) extending through the tubular shaft (43) and then to an output member (19) at the other end of the casing. The epicyclic differential gear gives a torque output to the output member (19) of approximately twice that to the inter-wheel differential gear in the unit, so that when the output member (19) is connected to a further inter-axle differential gear in a tri-axle drive, torque is approxiamately equally split between all three axles.

6 Claims, 5 Drawing Sheets

AXLE DRIVE UNIT

BACKGROUND OF THE INVENTION

1. Field of the Invention

This invention relates to axle drive units and to multi-axle drives.

Particularly the invention provides a tri-axle drive wherein the input torque is split between three driving axles and to a drive unit for use in such a tri-axle drive.

2. Description of Prior Art

It has previously been proposed, for example in patent application GB 2066182A to have a tri-axle drive including various clutch means so that different combinations of axles can be selected for driving purposes. As described in said application the input torque from the engine is split equally between a first axle on the one hand and second and third axles on the other. When all the axles are driven the first axle thus receives 50% of the input torque and the second and third axles receive 25% of the input torque each.

This means in practice that there could be a tendency for the wheels of the first axle to skid. Moreover, for the parts of each axle to be stressed equally the first axle would have to be of substantially twice the capacity of the second and third axles.

It is usual in a tri-axle drive to wish to have all three axles using common parts and therefore in the prior art arrangement, if all the axles do use common parts, either the first axle will be stressed at its load capacity with each of the second and third axles stressed at half its load capacity or if the second and third axles are stressed to load capacity the first axle will be over-stressed.

It has also been proposed in relation to four-wheel-drive vehicles, as distinct from six-wheel-drive vehicles, to have axle drive units which contain an unequal torque split differential gear having two outputs. In these known arrangements the differential gear output receiving the greater torque is connected to the input element of an inter-wheel axle differential gear in the axle drive unit and the output receiving the lesser torque is connected to an output shaft arranged to drive the other axle.

Examples of such arrangements are shown in, for example, UK Patents Nos. 1,093,798; 1,138,942; 1,210,964 and 1,447,875.

In each of these examples the inter-wheel differential gear in the axle drive unit receives the greater amount of torque. The unequal torque split differential gear is a spur type differential gear and the input is to the planet carrier while the output to the inter-wheel differential gear in the axle drive unit is from the annulus gear and the output to the second axle is from the sun gear. These outputs can be concentric with the output from the annulus gear surrounding the output from the sun gear.

Such an arrangement is not suitable for a tri-axle drive unit where one requires to have the greater torque output from the unequal-torque-split differential gear divided between the second and third axles and to have the output delivering the lesser torque connected to the axle whose differential is within the axle drive unit.

SUMMARY OF THE INVENTION

It is an object of one aspect of the invention, therefore, to provide an axle drive unit suitable for a tri-axle drive and containing an unequal torque split differential gear connected to the engine output and an inter-wheel axle differential gear which receives the lesser torque output from the unequal torque split differential gear.

It is an object of another aspect of the invention to provide a tri-axle drive in which the torque received from the engine of a vehicle is split substantially equally between the three axles. This enables the three axles to be of common construction and each to be used to its best advantage from the point of view of equating the gross weight to be carried by the vehicle with axle life. In other words the three axles are stressed substantially equally and can therefore be of common construction saving costs and spares inventory.

According to one aspect of the invention, therefore, we provide an axle drive unit comprising:

a casing having opposite first and second ends;

an input member at the first end of the casing;

a spur gear epicyclic differential gear (the first differential gear) in the casing and comprising:

an annulus gear;

planet gears meshing with the annulus gear and the sun gear.

and a planet carrier on which the planet gears are rotatably mounted;

a generally U-section driving connection between the input member and the planet carrier, the connection passing around the outside of the annulus gear so that the planet carrier is driven from the side of said first differential gear remote from said first end of the casing;

an equal-torque split inter-wheel differential gear (the second differential gear) in the casing and having an input element;

first driving means interposed between said sun gear of the first differential gear and said input element and including a tubular shaft connected to said sun gear;

an output member at the second end of the casing;

and second driving means connecting said annulus gear of the first differential gear to said output member, said second driving means including a driving shaft within and rotatable with respect to said tubular shaft.

According to another aspect of the invention we provide a tri-axle drive comprising an input; first, second and third axles driven from said input and having respectively, first, second and third equal-torque-split, inter-wheel differential gears each having an input element; an unequal-torque-split fourth differential gear having an input element drivingly connected to said first-mentioned input and first and second outputs which deliver lesser and greater torque respectively, said greater torque being of the order of twice the lesser torque; means connecting the first of said outputs of the fourth differential gear to the input element of said first differential gear, an equal-torque-split, inter-axle fifth differential gear having an input element and two outputs; means connecting the second of said outputs of the fourth differential gear to the input element of said fifth differential gear; and means connecting the outputs of the fifth differential gear to the input elements of the second and third differential gears respectively.

Other features of the invention will be apparent from the following description and the appended claims.

BRIEF DESCRIPTION OF THE DRAWINGS

The invention will now be described in detail by way of example with reference to the accompanying drawings in which.

DESCRIPTION OF PREFERRED EMBODIMENTS

Figure 1:
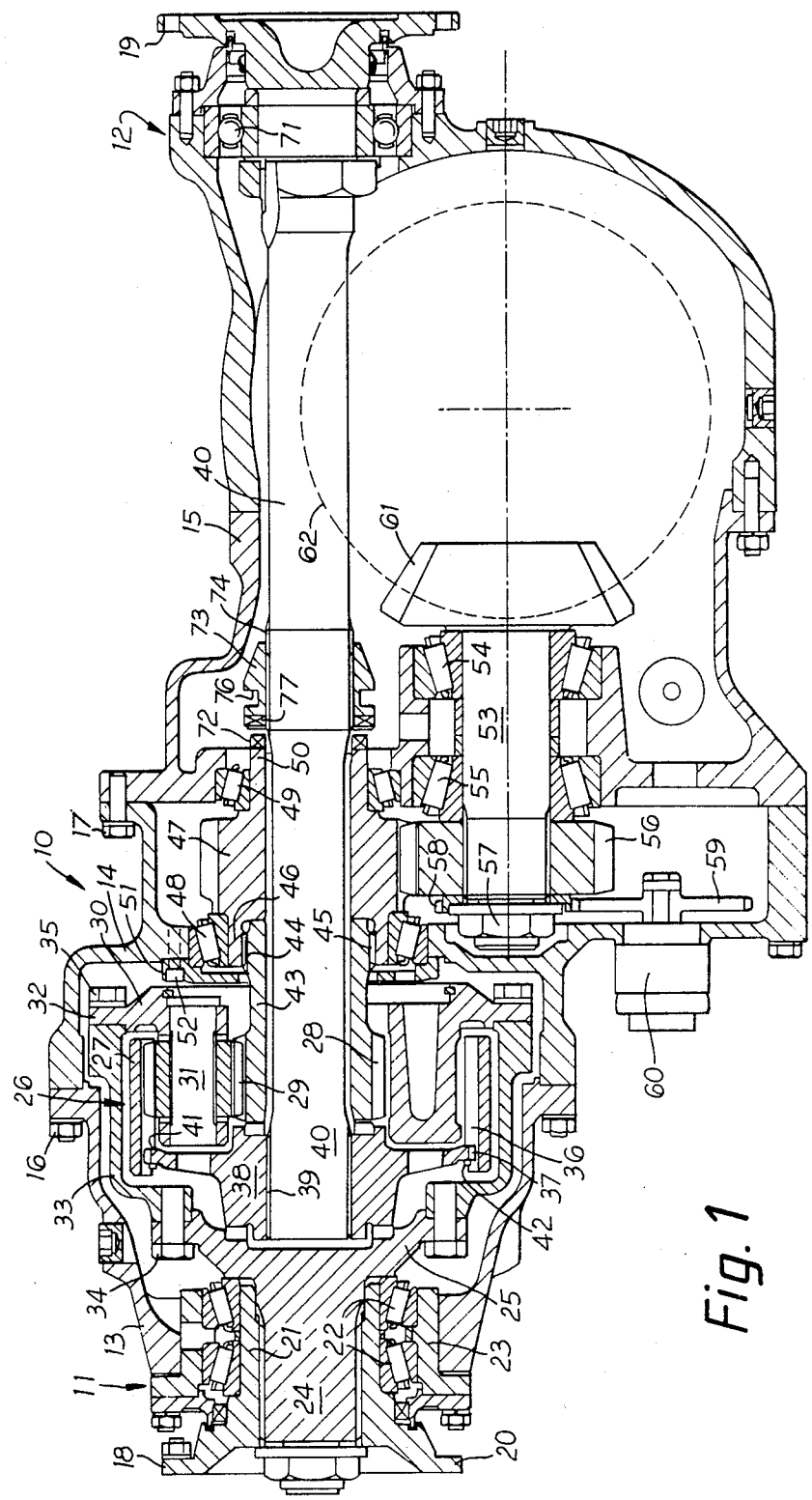
FIG. 1 is vertical section through an axle drive unit embodying a first aspect of the invention.
Figure 2:
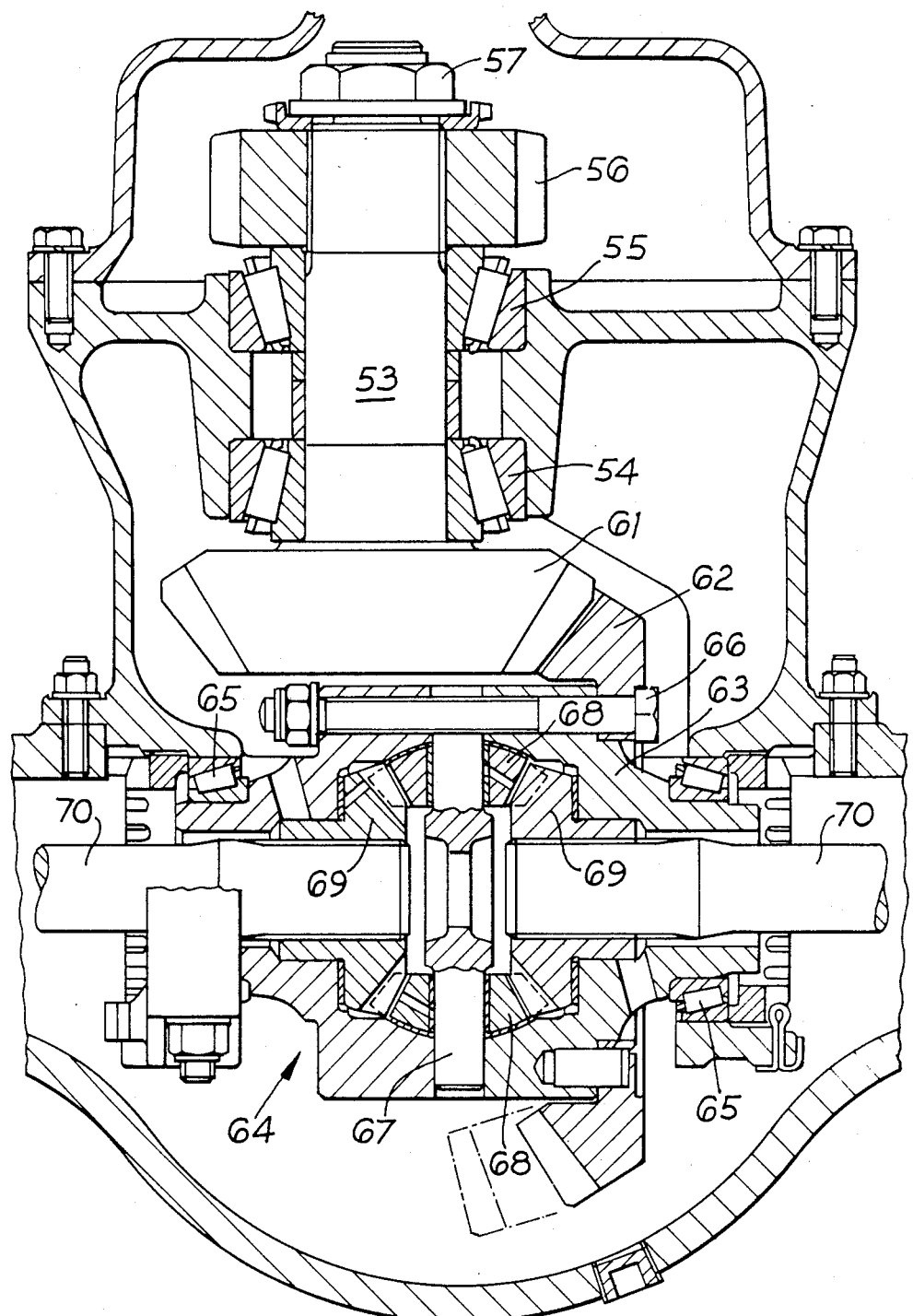
FIG. 2 is a horizontal section through part of the drive unit of FIG. 1 on the line 2—2 thereof.
Figure 3:
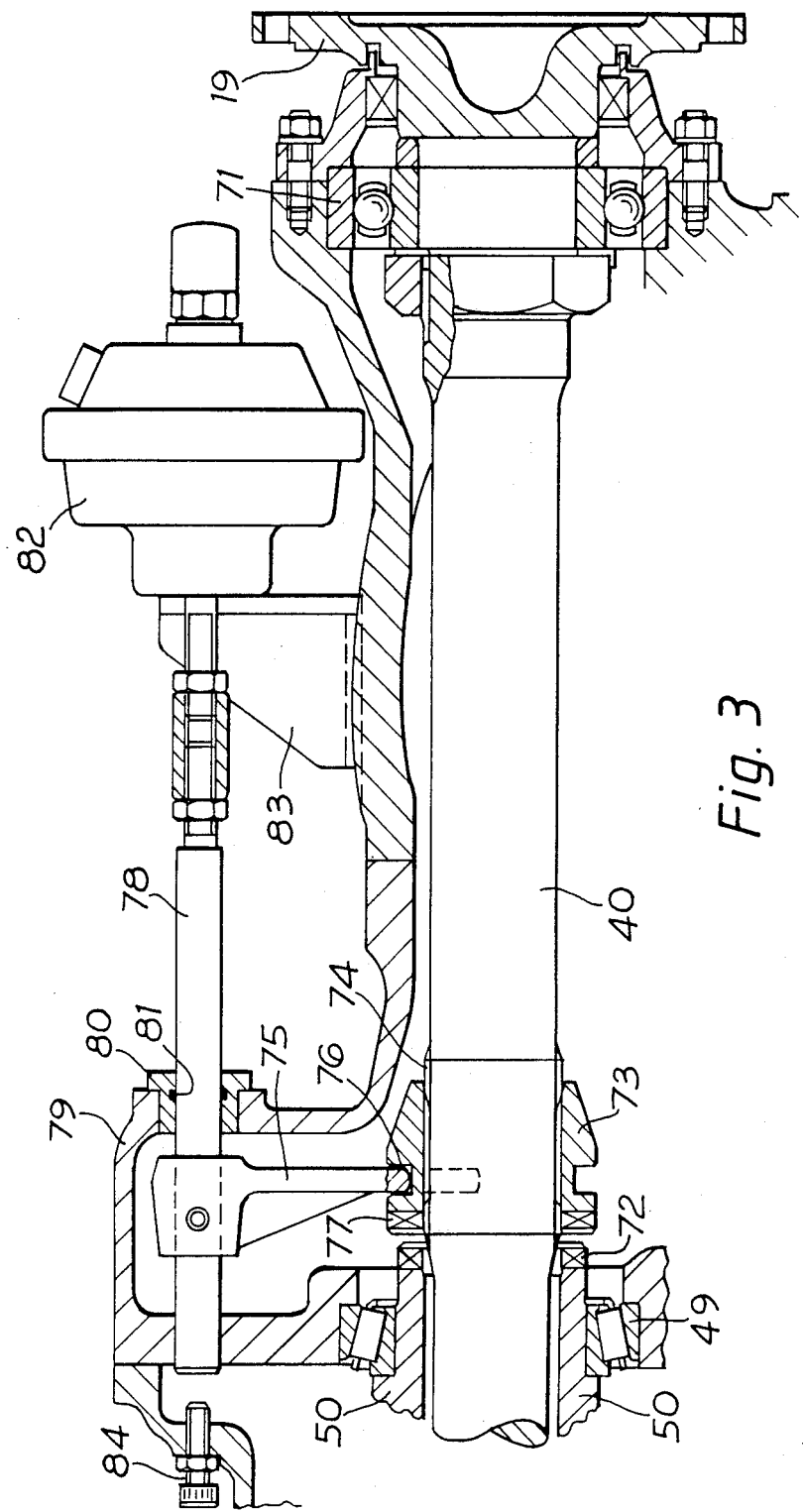
FIG. 3 is a detail view showing operating means for the inter-axle differential lock.

Referring now to FIGS. 1 to 3 the axle drive unit comprises a multi-part casing 10 having opposite first and second ends 11 and 12. The casing comprises a first end section 13, an intermediate section 14 and a second end section 15. The sections 13 and 14 are connected together by studs and nuts 16 and the sections 14 and 15 are connected together by studs and nuts 17.

The drive unit has an input member 18 at the first end 11 and an output member 19 at the second end 12.

The input member 18 comprises a coupling flange 20 having a hollow spigot 21 which is received in bearing means 22 mounted in a flanged sleeve 23 secured to the left-hand end (in FIG. 1) of the first end portion 13. Splined within the tubular spigot 21 is a shaft 24 having, at its right-hand end in FIG. 1, a flange 25.

Within the casing 10 is an unequal torque-split, spur-gear differential gear indicated generally at 26. The differential gear comprises an annulus gear sleeve 27, a sun gear 28, planet gears, one of which is shown at 29, meshing with the annulus gear 27 and the sun gear 28 and a planet carrier 30 carrying the planet gears 29 on planet pins 31.

The planet carrier is provided with an outwardly extending flange 32 and a sleeve 33 of generally L-section extends between the flange 25 on the shaft 24 and the flange 32 on the planet carrier. The left-hand end of the sleeve 33 is secured to the flange 25 by bolts 34 and the right-hand end of the sleeve 33 is connected to the planet-carrier flange 32 by bolts 35.

The annulus gear sleeve 27 has internal teeth 36 which are engaged by the teeth on the planet gears 29 and also by teeth 37 on a flanged member 38 splined at 39 to a driving shaft 40. The flanged member 38 is located on the annulus gear sleeve between a shoulder 41 and a circlip 42 received in a groove in the annulus gear sleeve 27.

The sun gear 28 is formed integrally with a tubular shaft 43 and is located at the left-hand end thereof in FIG. 1. The right-hand end of the tubular shaft 43 is provided with splines 44 and these engage with splines 45 on a tubular extension 46 of a hollow gear 47. The hollow gear is supported for rotation in the casing by bearing means 48 and 49, the bearing means 48 being supported on the tubular extension 46 and the bearing means 49 being supported on a further tubular extension 50 of the hollow gear 47. The bearing 48 is retained in the casing by means of a retainer plate 51 secured in position by pins 52.

This way of mounting the tubular shaft 43 on which the sun gear 28 is formed allows the sun gear to rock in operation by virtue of relative displacement of the splines 44 and 45.

A lay shaft 53 is mounted for rotation in the casing by bearings 54 and 55. At its left end the lay shaft carries a gear 56 held in position by a nut and washer assembly 57. The gear 56 meshes with the gear 47. The lay shaft also carries adjacent to the gear 56, a further gear 58 which meshes with a gear 59 arranged to drive an oil pump 60 mounted externally of the casing.

At its right-hand end the lay shaft carries a pinion 61 which meshes with a crown wheel 62 which is connected to the input element 63 of an inter-wheel differential 64 of a first axle.

The input element 63 of the differential 64 is formed by the differential carrier which is mounted in the casing in bearings 65. The crown wheel 62 is connected to the carrier 63 by a series of bolts 66.

Mounted within the carrier is a spider 67 having four arms on which are rotatably mounted four bevel gears on which only two are visible at 68. The bevel gears mesh with side gears 69 which receive the ends of two drive shafts 70 of a first axle as will hereinafter be described. The drive shafts 70 drive hubs, not shown, which in turn drive the road wheels mounted on the axle.

It will be apparent, therefore, that the drive to the differential 64 is from the input member 18, through the planet carrier 30 of the differential gear 26 then through the planet gears 29 to the sun gear 28 and via the tubular shaft 43 to the gear 47. The gear 47 drives the gear 56 which in turn drives the input member i.e. the carrier of the differential 64. The drive shafts 70 are therefore driven from the sun gear 28 i.e. from the output of the differential gear 26 which receives the lesser torque.

The right-hand end (in FIG. 1) of the driving shaft 40 is mounted in a bearing 71 at the second end 12 of the casing and is connected to the coupling flange 19 which forms the output member. It will be seen that the driving shaft 40 is located within and is rotatable relative to the tubular shaft 43.

The right-hand end of the tubular extension 50 of the hollow gear 47 is provided with teeth 72 (see FIGS. 1 and 3) and a clutch member 73 is slidable on splines 74 on the driving shaft 40 by means of a fork 75, received in a groove 76. The left-hand end of the clutch member 73 is provided with teeth 77 which can engage the teeth 72. As shown in FIG. 3, the fork 75 is mounted on a rod 78 slidable in an extension 79 of the casing part 15. The rod passes out of the casing part through a gland nut 80 having an O-ring 81. The rod is movable by an actuator 82 mounted on a bracket 83 on the casing part 15. Movement of the rod 78 to the left in FIG. 1 is limited by a stop screw 84.

With the clutch member 73 in the position in which it is shown in FIGS. 1 and 3 the differential, gear 26 is free to operate differentially. If the clutch member 73 is moved to the left in FIGS. 1 and 3 so that the teeth 72 and 77 engage then the differential gear 26 is locked by virtue of the fact that the annulus gear 27 and sun gear 28 are caused to rotate together.

It will be seen from the foregoing description that if there is an input to the input member 18 from the engine of a vehicle then the input is applied to the planet carrier 30 of the differential gear 26 through a generally U-section driving connection formed by the sleeve 33 and the flange 32. The planet carrier of the differential gear 26 is thus driven from the end of the epicyclic gearing remote from the first end 11 of the casing 10. This arrangement enables the output from the epicyclic differential gearing 26 taken from the annulus gear 27 to be located within the output of the differential gear 26 taken from the sun gear 28.

It will be apparent that the differential gear 26 will give unequal torque outputs, the greater torque output being delivered from the annulus gear 27 and the lesser torque output being delivered from the sun gear 28. The greater torque output is delivered to the driving shaft 40 and thus to the output member 19 to drive second and third axles as will be described below.

The lesser torque output from the sun gear 28 is arranged to drive, through the gears 47 and 56 the lay shaft 53 which in turn drives the inter-wheel differential 64 of the first axle. Thus the first axle is connected to the lower torque output of the differential gear 26.

It is required, for a tri-axle drive of the invention that the torque delivered to the driving shaft 40 and thus to the second and third axles will be of the order of twice the torque delivered to the spun gear 28, the tubular shaft 43 and the axle differential 64.

It may not be convenient for the torque split to be exactly 2:1 and in a particular example the torque delivered to the driving shaft 40 will be 69% of the input torque to the coupling flange 18 while the torque delivered to the inter-wheel differential 64 from the sun gear 28 will be 31% of the input torque. As will be described, when the torque delivered from the driving shaft 40 is split equally between the second and third axles, each of those will therefore receive 34½% of the input torque whereas the first axle will receive 31% of the input torque. It will be seen, therefore, that each of the axles will receive an approximately equal amount of the torque input to the axle drive unit.

Figure 4:
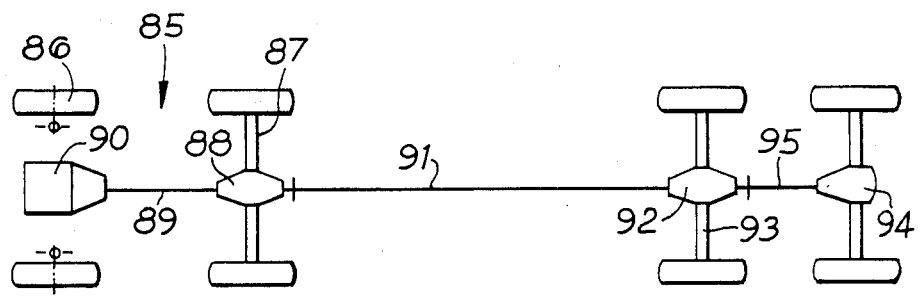
FIGS. 4, 5 and 6 are diagrams illustrating various arrangements of tri-axle drive embodying the invention.

Referring now to FIG. 4, this shows one arrangement of a tri-axle drive embodying the invention in diagrammatic form. Thus a vehicle is indicated at 85 having front steerable wheels 86 and a first drive axle 87. The drive axle 87 has a drive unit 88 as described in relation to FIGS. 1 to 3 and the input to the drive unit is connected to a propeller shaft 89 driven by the engine 90 of the vehicle. The road wheels of the axle are driven by the drive shafts 70. The output member 19 of the drive unit 88 is connected to a further propeller shaft 91 which is connected to a drive unit 92 of a second axle which includes, as will be described below, an equal-torque-split, inter-axle differential gear. This inter-axle differential gear apportions the torque it receives equally between a second axle 93 and a third axle 94 to which one of the outputs of the inter-axle differential gear 92 is connected by a shaft 95.

Thus if, as in the foregoing example, the drive unit 88 divides the torque in the ratio of 69% to 31%, the axle 87 will receive 31% of the input torque and each of the axles 93 and 94 will receive 34½% of the input torque. In the arrangement of FIG. 4, the vehicle may be a rigid vehicle or the wheels 86 and axle 87 may be on a tractor vehicle and the axles 93 and 94 on a trailer vehicle.

Figure 5:
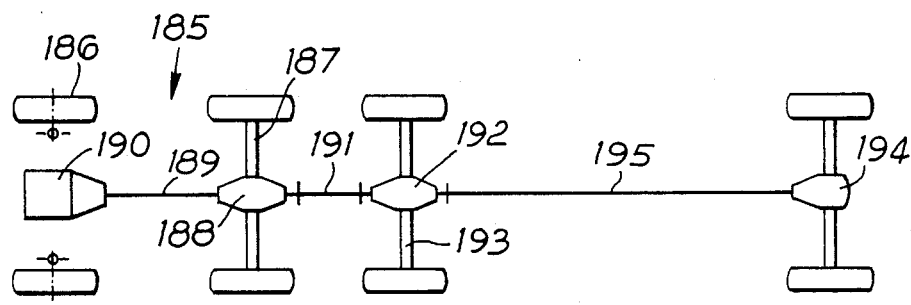
Figure 6:
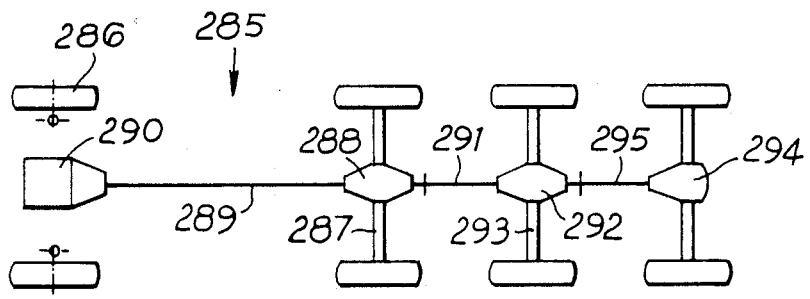

FIGS. 5 and 6 show different arrangements of the three axles and corresponding parts in FIGS. 5 and 6 to those in FIG. 4 are denoted in FIGS. 5 and 6 by the reference numerals used in FIG. 3 with the prefixes 1 and 2 respectively.

Figure 7:
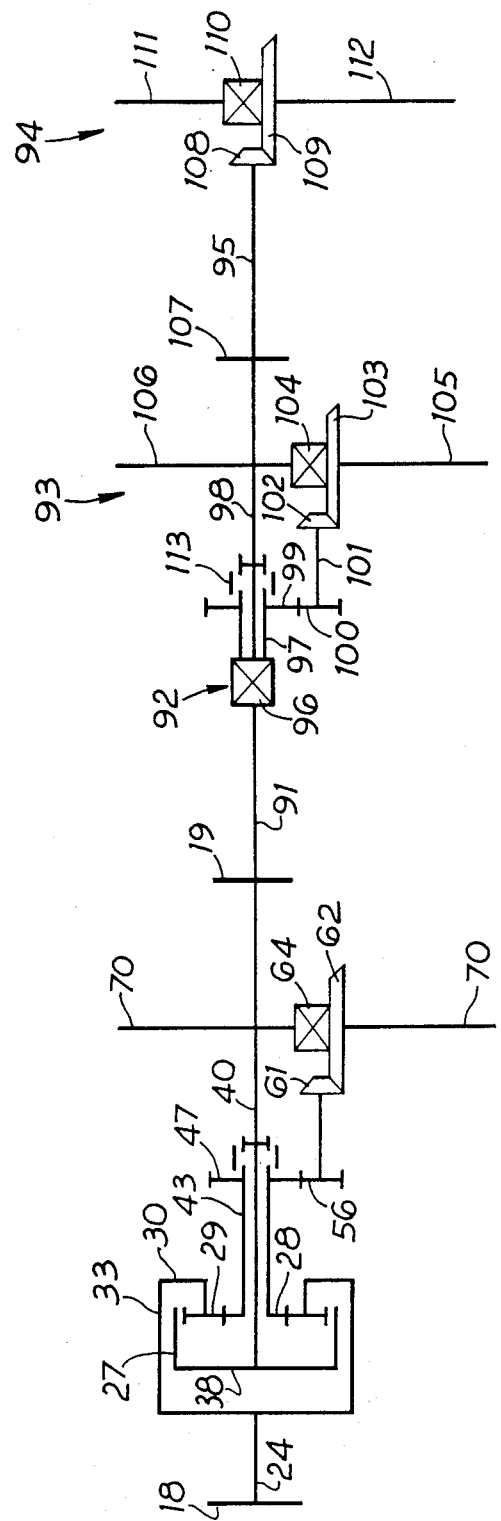
FIG. 7 is a diagram showing the differential arrangements of a tri-axle drive embodying the invention.

Referring now to FIG. 7 this shows diagrammatically the arrangement shown in FIG. 4. The drive unit described relating to FIG. 1 is shown diagrammatically at the left of FIG. 7 and the parts shown therein are given the same reference numerals as in FIGS. 1 to 3.

The output member 19 drives, through the drive shaft 91, the drive unit 92 in the second axle 93 which includes an equal-torque-split differential 96 having two outputs and which are constituted by a hollow shaft 97 and a shaft 98 respectively; the shaft 97 surrounds the shaft 98. The shaft 97 carries a gear 99 which meshes with a gear 100 on a lay shaft 101 which in turn carries a pinion 102 driving a crown wheel 103. The crown wheel 103 drives the input element of an equal torque split differential gear 104 which distributes the torque equally between the drive shafts 105 and 106 connected to the wheels of the second axle 93.

The shaft 98 has a coupling flange 107 which is connected to the drive shaft 95. The latter is connected to a drive unit in a third axle 94 and drives a pinion 108 which in turn drives a crown wheel 109 in the drive unit. The crown wheel 109 drives the input element of an equal torque split differential gear 110 which splits the torque equally between the drive shafts 111 and 112 of the third axle 94.

It will be seen therefore that the 69% of the input torque delivered at the coupling flange 19 is split equally by the equal torque split differential 96 between the axles 93 and 94 and that in each axle 93 and 94 there is an equal torque split differential 104 and 110 respectively which splits the input torque to that axle equally between the drive shafts of the axle.

In the arrangement described, therefore, the drive shafts 70 of the first axle receive 31% of the input torque, the drive shafts 105 and 106 of the second axle receive 34½% of the input torque and the drive shafts 111 and 112 of the third axle receive 34½% of the input torque.

Thus it will be seen that we provide a tri-axle drive in which the torque delivered to each of the three axles is approximately equal with the advantages set out in the preamble to the specification.

A differential lock 113 is provided for the inter-axle differential 96 and is operable by mechanism similar to that shown in FIG. 3.

I claim:
1. An axle drive unit comprising:
a casing having opposite first and second ends;
an input member at the first end of the casing, the input member comprising an input coupling flange having a tubular spigot;
bearing means supporting said spigot at said first end of the casing;
a spur gear epicyclic first differential gear in the casing and comprising:
an annulus gear;
a sun gear;
planet gears meshing with the annulus gear and the sun gear; and
a planet carrier on which the planet gears are rotatably mounted;
a generally U-section driving connection between the input member and the planet carrier, the connection comprising a shaft received within said spigot and having a flange within the casing and a sleeve connecting said last-mentioned flange to a flange on the planet carrier, the sleeve extending around the outside of the annulus gear so that the planet carrier is driven from the side of said first differential gear remote from said first end of the casing;
an equal-torque split inter-wheel second differential gear in the casing and having an input element;
first driving means interposed between said sun gear of the first differential gear and said input element and including a tubular shaft connected to said sun gear;
an output member at the second end of the casing; and second driving means connecting said annulus gear of the first differential gear to said output member, said second driving means including a driving shaft within and rotatable with respect to said tubular shaft.

2. An axle drive unit according to claim 1 wherein said output member comprises a coupling flange connected to one end of said driving shaft, the other end of the driving shaft being connected to said annulus gear.

3. An axle drive unit according to claim 1 including clutch means operable to lock together said driving shaft and said tubular shaft.

4. A tri-axle drive comprising:
an axle drive unit according to claim 1;
a first axle containing said second differential gear;
second and third axles each having an equal torque split inter-wheel differential gear provided with an input element;
an equal torque split, inter-axle differential gear having an input element and two outputs;
means connecting the output member of the axle drive unit to the input element of said inter-axle differential gear; and means connecting the outputs of said inter-axle differential gear to the input elements of the inter-wheel differential gears of the second and third axles respectively.

5. An axle drive unit according to claim 1 wherein the sun gear is at one end of said tubular shaft and the other end of said tubular shaft is splined within a tubular extension of a hollow gear, and wherein bearing means are interposed between said hollow gear and the casing to mount said gear for rotation within the casing.

6. An axle drive unit according to claim 5 including a lay shaft supported in bearings in the casing, a gear on the lay shaft meshing with said hollow gear, a pinion on the lay shaft and a crown wheel meshing with the pinion and connected to the input element of the second differential gear.

* * * * *